United States Patent [19]
Rockwood et al.

[11] 3,738,656
[45] June 12, 1973

[54] PINSETTER MASKING

[75] Inventors: Albert M. Rockwood, North Muskegon; Robert W. Lemieux, Spring Lake; Allen Lutz, Muskegon, all of Mich.; Ralph M. Lazar, Skokie, Ill.

[73] Assignee: The Brunswick Corporation, Skokie, Ill.

[22] Filed: Sept. 23, 1971

[21] Appl. No.: 183,132

[52] U.S. Cl. ............................. 273/54 R, 40/132 R
[51] Int. Cl. ............................................. A63d 5/04
[58] Field of Search ................ 273/54 R; 40/130 R, 40/130 F, 132 R

[56] References Cited
UNITED STATES PATENTS

| 1,702,497 | 2/1929 | Craig | 40/130 F |
| 2,437,555 | 3/1948 | Rees | 40/130 R |
| 1,211,447 | 1/1917 | Houze | 40/130 R UX |
| 3,018,105 | 1/1962 | Gorgoza | 273/54 R |

Primary Examiner—Anton O. Oechsle
Attorney—Donald S. Olexa, John G. Heimorris, William G. Lawler, Jr. and Sheldon L. Epstein

[57] ABSTRACT

A bowling lane pinsetter masking unit including a transparent panel having a prismatic pattern impressed thereon and light sources positioned at varying distances therebehind, the character of the prism pattern and the location of the light sources being such as to create a unique and attractive light pattern.

8 Claims, 6 Drawing Figures

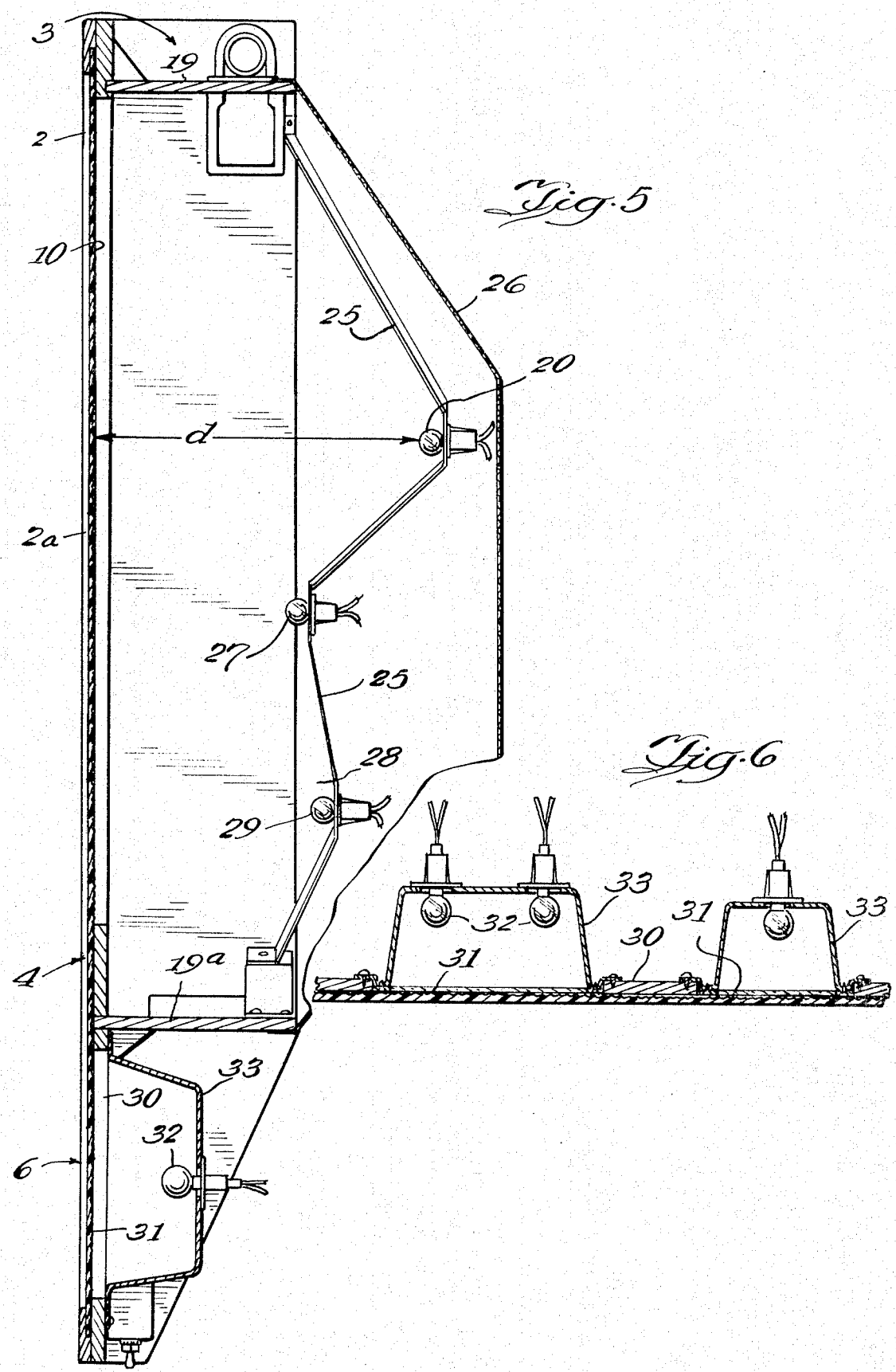

PINSETTER MASKING

BACKGROUND

The invention is in the field of devices which create special visual effects, but more specifically relates to masking units which serve to screen the bowling pinsetting mechanism of a bowling lane from the view of the bowler standing at the opposite or approach end of the lane, and to display certain information to the bowler.

The invention achieves a novel visual effect through the selective placement of light sources behind a transparent panel of plastic or glass material having a prismatic inner face. The effects achieved by the invention are influenced primarily by the relationship of the distance of the light sources from the prismatic face, and by the angular dimensions, shape and number of prisms per unit area of the prismatic surface, all as set forth herein.

It is an objective of the invention to achieve a unique visual effect utilizing a light source and a prismatic screen.

It is a further objective of the invention to achieve the aforesaid unique visual effect with a minimum distance between the light source and the prismatic screen, consistent with the visual effect desired.

It is still another objective of the invention to provide means associated with said means for achieving a unique visual effect for clearly displaying symbolic information through the prismatic screen.

SUMMARY

Basically the invention comprises a panel or screen of transparent material having a prismatic pattern imposed upon one face thereof and a glare reducing wave pattern upon the other.

Light sources positioned on the prism side of the panel and radiating therethrough produce a unique visual effect determined largely by the character of the valleys and peaks of the prism surfaces.

Means for displaying game information through the panel screen include strike and ball symbol masks placed immediately adjacent the prism face and means for projecting light therethrough to present a bright clear symbol to the viewer.

Among the advantages of the invention are:

1. All of the light sources may be positioned relatively near the prism screen keeping the depth of the assembly at a minimum.
2. A broad spectrum of light patterns may be achieved with relatively small variations in distances of the light sources behind the prism screen.
3. Individual light sources are readily accessible for replacement.

Other objectives, advantages and various further features of novelty and invention will be pointed out or will occur to those skilled in the art from a reading of the following specification in conjunction with the accompanying drawings.

BRIEF DESCRIPTION OF THE DRAWINGS

FIG. 5 is a cross sectional view of a masking shield of the invention taken along Line 5—5 of FIG. 2.

FIG. 6 is a partial cross sectional view of a portion of the masking shield of FIG. 2 taken along Line 6—6.

Figure 1:
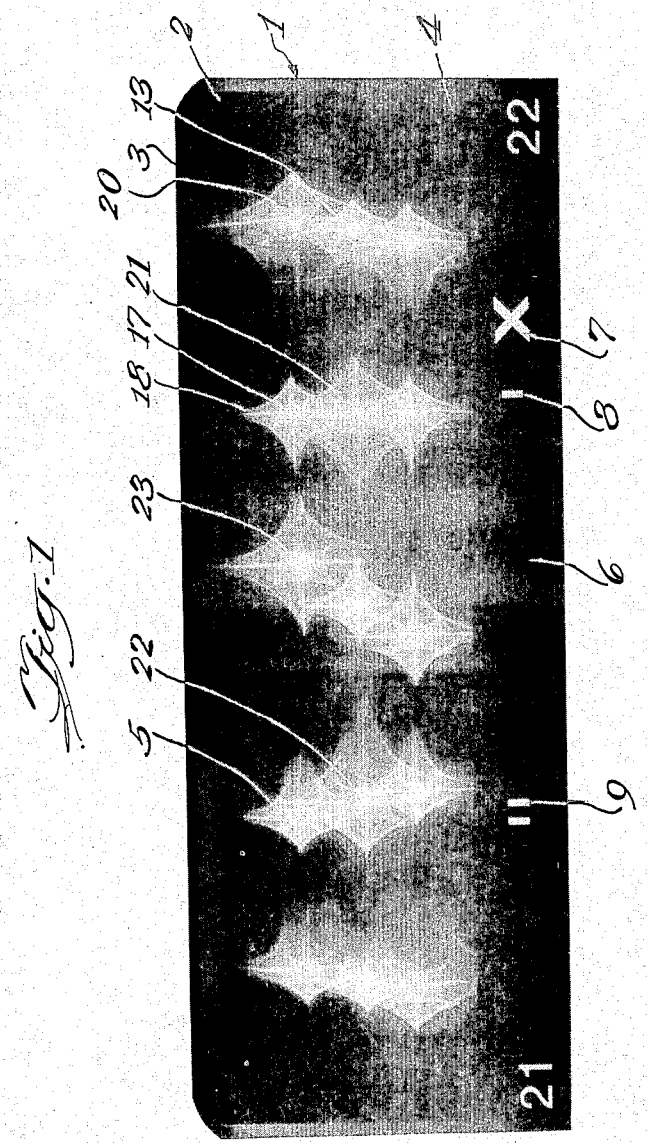
FIG. 1 is a photographic plan view of the lighted face of a masking shield of the invention illustrating the visual effect achieved thereby.

DETAILED DESCRIPTION OF THE PREFERRED EMBODIMENT:

FIG. 1 illustrates the artistic effect of a masking shield 1 of the invention. The plastic star panel 2 is mounted within a frame 3, and divided into an upper portion 4 which in combination with light sources therebehind forms the display images 5, and a lower portion 6 upon which the symbols for a "Strike" 7, first ball 8 or second ball 9 may appear.

FIG. 1 illustrates one of the many light patterns that can be achieved by the invention when multiple light sources are used. A dominant characteristic of the image 5 produced by each individual light source is that it forms essentially a square 17 within a square 18, both squares having sides which are mildly concave, and the corners of the inner square 17 intersecting the medians of the sides of the outer square 18. This pattern will be observed only when the light sources utilized consist of a single filament surrounded by a clear glass bulb.

Another characteristic of the images produced by the invention is that they can be overlapped as at 13, in which event the brightest image will generally dominate without material distortion of the remainder of either image.

Figure 3:
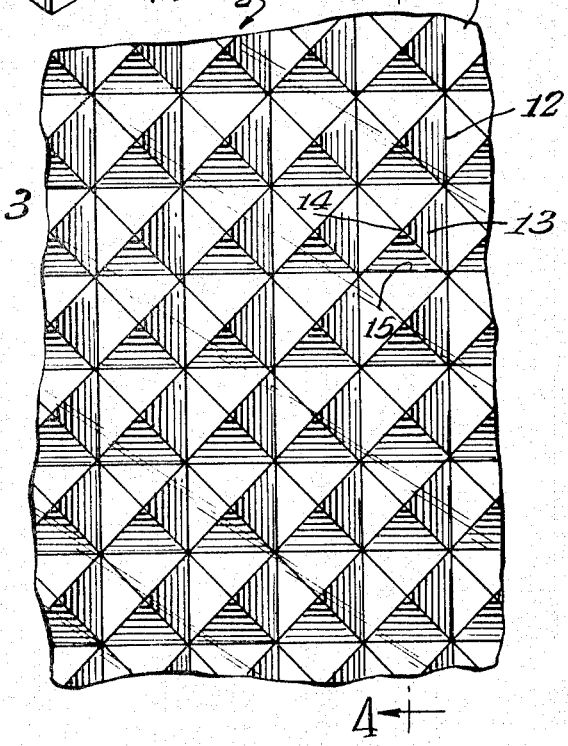
FIG. 3 is an enlarged plan view of a portion of a prismatic face of a prismatic screen utilized in a masking shield of the invention.
Figure 4:
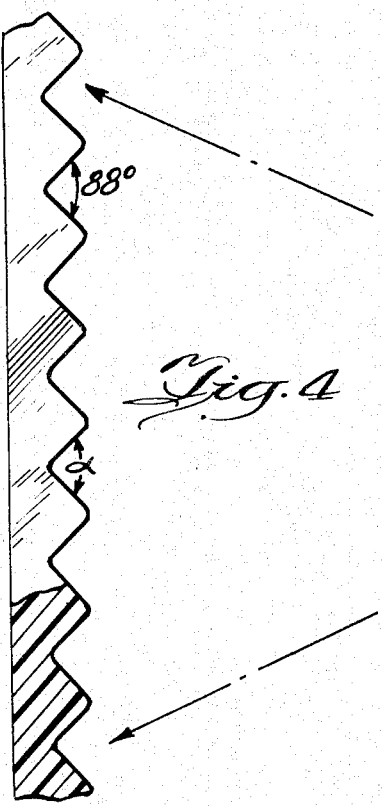
FIG. 4 is a cross sectional view taken along Line 4—4 of the prismatic face illustrated in FIG. 3.

FIGS. 3 and 4 illustrate the configuration of the image producing surface 10 of a panel 2 of the invention. The surface 10 comprises a continuous three-dimensional pattern of pyramid shapes 12 of uniform size and shape.

Each pyramid 12 has four equal sides 13 each in the shape of a triangle, which come together at the apex 14. The base of each pyramid is thus a square 15, and the sides of the bases are adjacent one another on all sides, the net effect of which is to impress an equilateral pyramidal grid into the surface 10 of the panel 2. It will be appreciated that a virtually infinite number of patterns of these unique squares may be achieved by varying the number and positions of the light sources utilized.

In the course of experiment it was discovered that the smaller the angle between the sides of adjacent pyramids, the larger the light pattern became; and conversely, the larger the angle the smaller the characteristic image 5 created. An optimum of 88 degrees was selected as presenting a most attractive pattern consistent with clarity and brilliance.

It was also discovered that by rounding all edges of the pyramid shapes 12 including their apexes 14 and the lines of intersection of their bases 15 the inner square 17 of the image 5 was created where it had not appeared theretofore. The precise cause of this effect has not been determined.

FIGS. 4 and 5 illustrate a configuration of the invention for producing an image pattern similar to that illustrated in FIG. 1. The greater the distance $d$ between a source of illumination 20 and the prismatic face 10 of the panel 2, the larger the image 5 produced. The image 5 is further increased in size (with $d$ constant) by orienting the panel 2 with the prismatic surface 10 facing the light source 20. This orientation makes it possible to create a selected image pattern with a minimum focal distance $d$, and also permits the pattern to be observed from a maximum angle to the front face of the panel 2.

The light sources 20 may be retained in series at various distances from the prismatic surface 10 by strap-like supports 25 which are attached by their ends to the upper and lower portions 19 and 19a respectively of the frame 3 of the upper portion 4 of the shield 1. In the case of those light sources placed furtherest from the panel 2, i. e. 20, 21 and 22, care must be taken not to place any obstruction immediately adjacent to the sides thereof which would interrupt the path of light to the prism screen 10, otherwise loss of the image will occur when the viewer moves toward the side.

The light supports 25 are covered by an opaque cloth 26 removably attached along its periphery to the frame 3 so that it encloses all the light sources and permits light to escape only through the upper portion 4 of the prismatic panel 2.

No shielding of the light source is required to achieve the characteristic image 5, and obstructions between a light source and the prism screen near the line of sight from a viewer to the light source can cause distortion or loss of the image 5.

Figure 2:
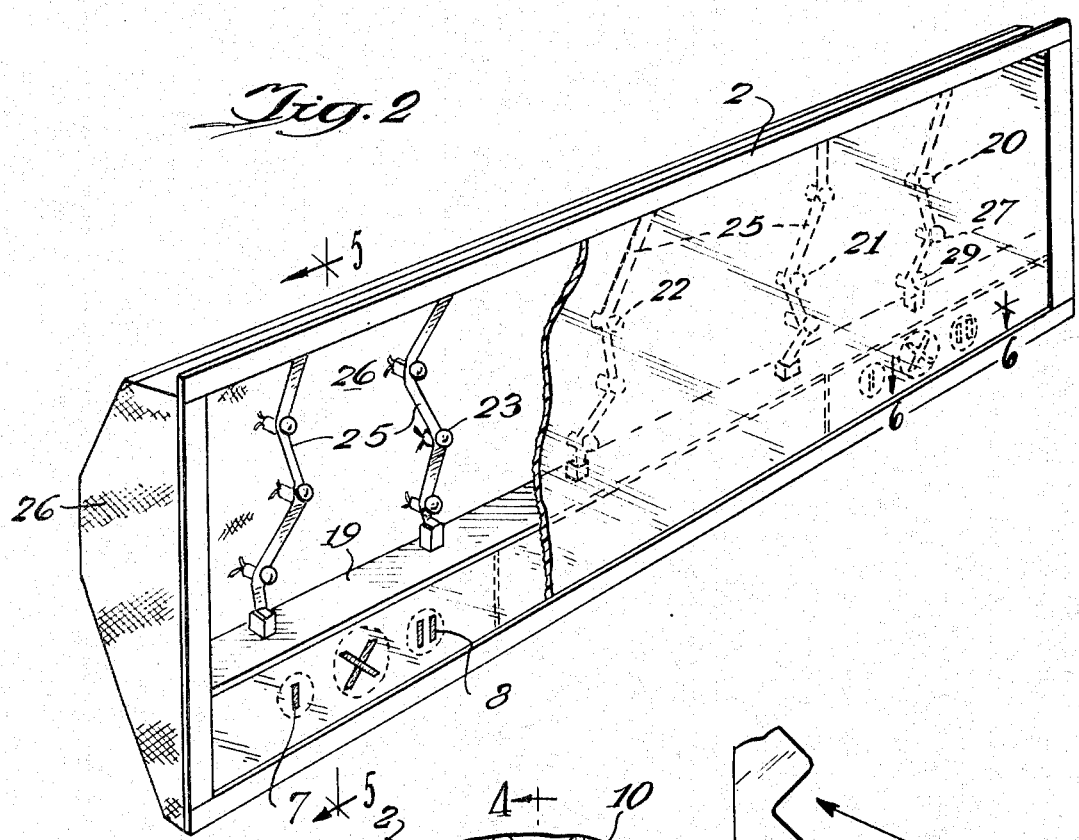
FIG. 2 is a partially cut away perspective view taken from above and to the left front of a pinsetter masking shield of the invention.

Referring to FIGS. 2, 5 and 6, the lower portion 6 of the prismatic face 10 is covered by a wood panel 30, except where display devices 7, 8 and 9, which indicate first or second ball, or a strike, are attached.

Each such display device includes a mask 31 from which is cut the appropriate strike or ball symbol mounted adjacent the prismatic surface 10 of the panel 2, and a projecting light source 32 mounted within a housing 33. The housings 33 permit radiation only through the symbol cut from the mask 31, and are attached by appropriate means to the cover panel board 30 so as to hold the masks 31 in place against the prism face 10.

The front surface 2a of the prismatic panel 2 is essentially flat, and normally would be highly reflective and objectionable to the bowler except for two novel treatments. The first is a small longitudinal wave form induced by the extrusion pattern when the plastic panel is extruded which tends to break up reflection, and the second is an anti-gloss lacquer treatment which cuts reflectence from 95 to 85 as on a 60° gloss meter. Any decrease in gloss level from this point was found to degrade the blackness of the background toward a gray which is considered objectionable.

It is further possible to enhance the attractiveness of the display by varying the color of the light source, as well as the color of the prismatic material, which acts as a color filter. For example, use of blue prismatic material in combination with a yellow bulb will produce white star patterns in a blue field. Substitution of a white or a blue light will produce blue stars in a blue field.

While the principles of the invention have been described in connection with the above specific apparatus, it is to be clearly understood that this description is made only by way of example and not as a limitation to the scope of the invention.

We claim:

1. A pinsetter masking device for a bowling lane comprising,
    a translucent panel one surface of which comprises a three-dimensional prismatic pattern,
    a plurality of sources of illumination radiating light through said panel, and
    means for supporting said sources of illumination in discrete preselected positions behind said panel,
    said prismatic pattern being such that each of said sources of illumination will produce a discrete light pattern upon said panel as viewed from the front, the prismatic pattern on the one surface of said panel comprising a multiplicity of pyramids arrayed adjacent one another and substantially covering said one surface and the apexes of said pyramids and the junctions between the respective sides of said pyramids being rounded so that the light pattern created by a single filament light source is substantially a square within a square with the axes of one of said squares being rotated 90° with respect to the other.

2. The device of claim 1 wherein said translucent panel is colored and appears generally opaque when viewed in the absence of said sources of illumination.

3. The device of claim 1 further including means for reducing the reflectivity of the front surface of said panel including a wave pattern impressed upon said front face of the panel.

4. The device of claim 1 further including means attached to said panel and disposed around said sources of illumination for absorbing substantially all light radiated thereby except that falling upon said panel.

5. A bowling lane masking unit comprising:
    a translucent panel and first means for illuminating said panel by directing light therethrough, said panel appearing generally opaque to the bowler in the absence of said illumination,
    the back face of said panel facing said means for directing light therethrough comprising
    a prismatic pattern on one surface of said panel comprising a multiplicity of pyramids arrayed adjacent one another, the apexes of said pyramids and the junctions between the respective sides of said pyramids being rounded so that the light pattern created by a single filament light source is substantially a square within a square with the axes of one of said squares being rotated 90 degrees with respect to the other, and further including
    means for presenting information to the bowler in symbol form including
    means for masking off a portion of said panel, and
    second illuminating means for illuminating said masked off portion of said panel, said masking and second illuminating means together causing a symbol to appear in sharp focus upon the face of the masking unit.

6. The device of claim 5 wherein said masking means is disposed against the prismatic surface of said panel.

7. In a bowling lane having an automatic pinsetter, a unit for masking the major portions of the pinsetter mechanism from the view of the bowler comprising
    an upright translucent plastic panel and means for retaining said panel in position above the bowling lane and in front of the pinsetter, the back of said panel facing the pinsetter having a three-dimensional prismatic pattern impressed therein and the front of said panel facing the bowler being covered with a glare reducing coating, so that said panel appears generally opaque to the bowler, means for creating a light pattern upon an upper portion of said panel, and means for displaying ball signals upon a lower portion of said panel, said means for creating a light pattern comprising a plurality of single filament light bulbs, means for positioning said bulbs at discrete distances behind said prismatic surface, and means for preventing the radiation of extraneous light through said panel, and said means for displaying said ball signals comprising masking means disposed adjacent the lower portion of said panel for defining the ball symbols, and means for radiating light through said masking means.

8. The device of claim 1 wherein the angle between the sides of adjacent pyramids is 88°.

* * * * *